United States Patent [19]

Kotula et al.

[11] 4,349,988

[45] Sep. 21, 1982

[54] HERBICIDE DISPENSING APPARATUS

[76] Inventors: Frank T. Kotula, 4058 Nevada Ave. North, New Hope, Minn. 55427; Marvin E. Hilgemann, R.R. 4, Box 230, Pipestone, Minn. 56164

[21] Appl. No.: 157,358

[22] Filed: Jun. 9, 1980

[51] Int. Cl.³ .......................................... A01M 21/00
[52] U.S. Cl. ..................................................... 47/1.5
[58] Field of Search .................... 47/1, 44, 1.5, 1.7, 47/81; 119/156, 157; 401/285

[56] References Cited

U.S. PATENT DOCUMENTS

| | | | |
|---|---|---|---|
| 2,223,809 | 12/1940 | Rucker | 47/1.5 |
| 2,238,935 | 4/1942 | Gumaer | 47/81 X |
| 2,912,961 | 11/1959 | Stark | 119/157 |
| 4,168,798 | 9/1979 | Moore et al. | 47/1.7 X |
| 4,219,964 | 9/1980 | Dale | 47/1.5 |
| 4,223,478 | 9/1980 | McHugh | 47/1.5 |
| 4,253,272 | 3/1981 | Bertness | 47/1.5 |

FOREIGN PATENT DOCUMENTS

| | | | |
|---|---|---|---|
| 32671 | 10/1964 | German Democratic Rep. | 47/1.5 |
| 7807030 | 1/1980 | Netherlands | 47/1.5 |
| 152106 | 10/1955 | Sweden | 47/81 |

Primary Examiner—James R. Feyrer
Attorney, Agent, or Firm—Williamson, Bains, Moore & Hansen

[57] ABSTRACT

A herbicide dispensing apparatus utilizes an upright frame attached to a cultivator or other moveable farm vehicle and carries a pair of downwardly angled herbicide applicator arms which overlie a row crop and diverge laterally outwardly from the row. Wicking means is attached to the arms and conveys herbicide outwardly along each arm and applies it by contact to unwanted plants in the path of the arms. The arms are swingably received in sockets in the frame and pivot toward and away from each other so as to adjust the distance of separation between the ends of the arms so that such ends terminate over spaces between adjacent rows of crop, permitting excess herbicide to drop harmlessly into such spaces. A pair of tubes extend from a herbicide reservoir to the applicator arms, and metering clamps are positioned on each tube and cooperate with flow stabilizers within each tube to closely control the rate of herbicide flow through each tube.

5 Claims, 7 Drawing Figures

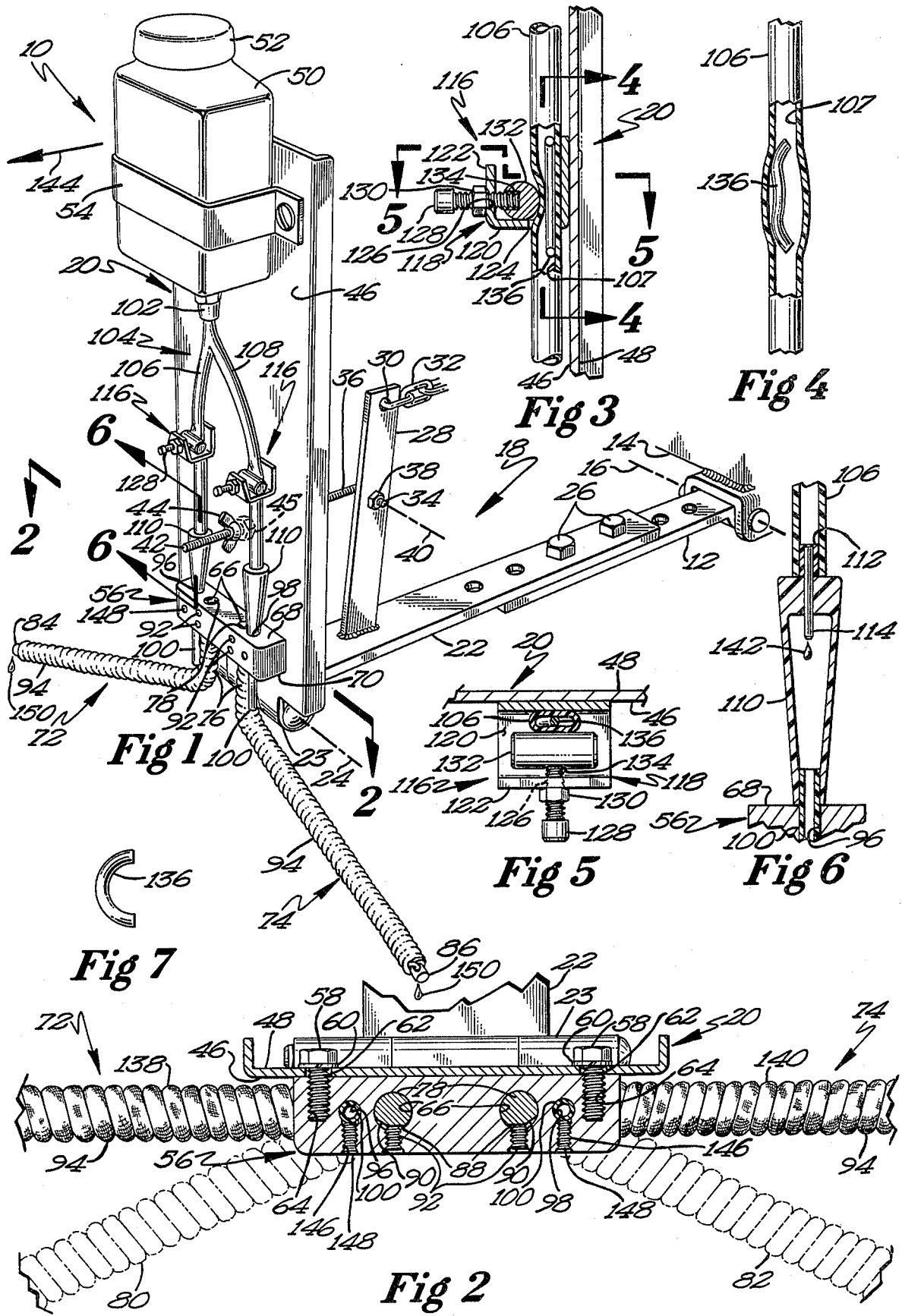

HERBICIDE DISPENSING APPARATUS

BACKGROUND OF THE INVENTION

In growing any relatively low row crop, as with soybeans, cotton, and the like, there is a continual needed effort to inhibit or destroy taller, unwanted plants which invade the row crop area. Commonly encountered unwanted plants include volunteer corn, sunflowers, Johnson grass, and other weeds which tower above the desired crop.

Destruction of the unwanted plants is a recognized problem, and many systems and devices have been developed to cope with the problem. A wide variety of sprayers have been used to destroy the unwanted plants, but spraying has its limitations because of the high risk of herbicide spray contacting the desired crop, particularly under windy conditions, and because of the high use rate and high evaporation loss of the costly herbicides used in such spraying. In an effort to conserve or reduce the amount of spray required for weed control, devices are now available which recapture some of the spray, and elaborate shield devices have been designed to try to protect the crop from wayward spray. As a result of these conservation and shielding efforts, herbicide spraying devices have become increasingly expensive to manufacture, complicated to operate and maintain, and the challenge of protecting the crop and substantially reducing herbicide loss during spraying still persists. With the continually increasing cost of chemical herbicide, spraying costs have mounted so substantially that any unnecessary waste of the chemical is to be discourged.

Another direction taken by the industry to provide adequate herbicide application includes direct application of the herbicide to unwanted plants by physical contact between the plants and a moving, saturated mat, canvas, rope or tube. For example, it is known to utilize a horizontally oriented porous tube extending at a level above the protected crop and to move it across the field and into contact against unwanted plants so as to impregnate the plants with herbicide. Related applicators have utilized sponges attached to the porous tubes and various types of matting which is impregnated with the herbicide and dragged over the unwanted plants. All of these devices have the disadvantage of requiring significant quantities of herbicide to saturate the mats and sponges and the significant surface areas of these devices result in high evaporation and drippage losses of the expensive herbicide. More recent devices have utilized horizontal rope or wick-type segments which are impregnated with the herbicide and which are moved across the field and into contact with the unwanted plants. These devices have an advantage over other units in that they do not involve spraying and have lower herbicide losses due to evaporation. While such devices are definite improvements, they still share a common shortcoming in that the rope or wicking, like the canvas and mats, at times becomes so soaked with herbicide that the herbicide drips downwardly onto the soybean or cotton crop, causing destruction and damage to the crop. It is highly important that the applicator apply the herbicide only to the unwanted plants and that it be prevented from reaching the nurtured crop. The present invention provides an improved, simplified, highly efficient and low-loss applicator which is constructed to assure that herbicide does not reach the protected crop.

SUMMARY OF THE INVENTION

The invention relates to the field of herbicide dispensing apparatuses which apply herbicide to unwanted plants by direct physical contact and provides an easily manufactured, inexpensive and highly efficient solution to the problem associated with previously available dispensers.

The invention utilizes an upright frame which may be carried by a cultivator or other movable farm vehicle and which has a pair of outwardly extending herbicide applicator arms which overlie the protected crop but are positioned to encounter and contact unwanted plants extending above the level of the crop. Wicking is attached to these lateral arms and herbicide delivered to the wicking is applied by contact to the unwanted plants during forward movement of the cultivator.

Herbicide flow control means carried by the frame extends between a herbicide reservoir and the wicking and delivers herbicide to the wicking at a measured, relatively slow rate calculated to closely match the rate of use of the herbicide. As a result of this very closely metered flow rate, little herbicide loss occurs from drippage. The laterally extending applicator arms are angled downwardly and are arranged to have their terminal ends positioned above the empty spaces between rows of crop so that any drippage of excess herbicide will drop harmlessly in such empty spaces. The dispensing apparatus thus provides a steady, controlled flow of herbicide which may be applied to the unwanted plants with minimal waste due to evaporation and very closely controlled drippage areas so that damage to crop from drippage is greatly reduced.

The applicator arms are preferably oriented at right angles to the direction of forward travel of the cultivator but are swingably mounted in sockets in the frame so that the arms may be swung in an arc toward and away from one another to thereby adjust the distance of separation between the terminal ends of the arms to assure that the ends lie over the empty spaces between rows of crop.

The herbicide flow control means includes flexible compressible plastic or rubber-like tubing connected to conduct herbicide from the herbicide reservoir to each of the arms, and a pair of herbicide metering valves is positioned along the tubing, one valve controlling the flow to one arm, and the second valve controlling the flow to the other. Each such metering valve involves a metering clamp which may be moved toward and away from the tubing so as to selectively reduce by compression the interior cross-sectional area of the tube and to thereby control the rate of flow therealong. Each such valve further includes flow control stabilizers positioned within the tube and confronting the clamp so that complete blockage of the tube is averted and so a more even flow of herbicide is maintained. Each stabilizer comprises a short length of rubber-like beading which is pre-shaped in an accurate configuration, so that when the beading is inserted within the tubing the natural tendency of the beading to resume its arcuate configuration causes the beading to contact and engage the interior periphery of the tube to thereby retain the beading in a predetermined position within the tubing and confronting the clamp.

A transparent observation chamber is preferably positioned downstream of the metering valves so that an operator can closely observe the drippage rate through each chamber to obtain a desired flow rate. In applying herbicide to a field of row crops, a plurality of such herbicide dispensing devices would be mounted on a cultivator with each such dispensing apparatus applying its herbicide to unwanted plants adjacent a single row of crop.

These and other objects and advantages of my invention will appear more fully from the following description made in conjunction with the accompanying drawings wherein like reference characters refer to the same or similar parts throughout the several views.

DESCRIPTION OF THE DRAWING FIGURES

FIG. 1 is a front perspective view of a herbicide dispensing apparatus embodying the invention and carried by the mounting bracket of a cultivator.

FIG. 2 is a top sectional view of the lower portion of the apparatus of FIG. 1 taken along cutting plane 2—2 and showing in phantom alternative positions of the herbicide applicator arms.

FIG. 3 is a cross sectional side view of one of the metering valves of the apparatus of FIG. 1.

FIG. 4 is a partially cutaway side view of the tube of FIG. 3 taken along cutting plane 4—4 of FIG. 3 and showing the engagement between the tube and the flow stabilizer.

FIG. 5 is a top cross sectional view of the metering valve of FIG. 3 taken along cutting plane 5—5 of FIG. 3.

FIG. 6 is a side cross sectional view of the observation chamber taken along cutting plane 6—6 of FIG. 1.

FIG. 7 is a top view of a length of arcuate rubber-or plastic-like beading which serves as a flow stabilizer.

DESCRIPTION OF THE PREFERRED EMBODIMENT

Referring now to FIG. 1, the herbicide dispensing apparatus 10 is shown mounted to a rigid, forwardly extending, swingably mounted bracket 12 of cultivator chassis 14 for swinging movement about a horizontal axis 16. As is well known to the art, cultivators are provided with a plurality of mounting brackets such as bracket 12 and in practice it is contemplated that a number of dispensing apparatus 10 may be mounted to as many brackets 12 as desired in order to adequately service the number of rows of crop requiring attention.

The dispensing apparatus 10 is provided with a generally upright frame 18 which may be mounted to the cultivator bracket 12 and which has an upright mounting panel 20 swingably mounted to a rearwardly extending bar 22 to allow pivoting movement about horizontal axis 24 of hinge 23. The bar 22 is removably, but securely, retained to the bracket 12 by bolts 26 which may be either threaded directly into the bracket 12 or passed therethrough to be retained by nuts.

An upright post 28 is rigidly fixed to the bar 22 by any known means, such as welding, and is provided with a transverse aperture 30 at the top thereof to which chain 32 is attached. The chain 32 extends from the post 28 to a movable lever or bar (not shown) on the cultivator by which an operator can move the lever or bar to swing the mounting bracket 12 about the axis 16, and thereby raise or lower the apparatus 10 relative to ground level.

Intermediate along the upright post 28, an aperture is provided to receive end segment 34 of an L-shaped threaded rod 36, the end segment 34 being swingably retained to the post 28 by locking nut 38, permitting the rod 36 to swing about the axis 40 of segments 34. The remaining end 42 of the threaded rod 36 passes through an aperture in the panel 20 and is selectively, rigidly secured to the panel by wing nuts 44, and hex nut 45, wing nut 44 being located on the front surface 46 of panel 20 and the hex nut 45 on the rear surface 48 with the nuts being rigidly tightened against the panel 20 to lock the panel in a predetermined upright orientation. It will be understood by those skilled in the art that it is desirable to retain the panel 20 in a generally vertical orientation during operation, and that by selectively tightening and loosening the nuts 44 and 45 the panel 20 can have its front surface 46 oriented and retained in a substantially vertical plane.

The upright panel 20 is preferably formed of rigid metal sheet and at the top thereof carries a herbicide reservoir 50 having a filling port 52. The reservoir is preferably formed of a plastic-like translucent material and is secured to the panel 20 by any known means, a simple strap 54 being preferred. While it is preferred to have a herbicide reservoir on each of the dispensing apparatuses 10 used on the cultivator, it should be understood that it is also possible, as an alternative, to utilize a single, larger herbicide reservoir mounted at a convenient location on the cultivator chassis 14 and which is connected to deliver herbicide to all the herbicide dispensers 10, and that such an alternative is within the purview of the invention.

Referring now to FIGS. 1 and 2, a rigid mounting block 56 is rigidly fixed to the front face 46 of the panel 20 by any known means such as bolts 58 and lockwashers 60, the bolts passing through apertures 62 in panel 20 and being threaded into bores 64 of the block. The upright panel 20, swingably mounted bar 22, post 28, and block 56 collectively comprise a frame useable with the apparatus 10.

A pair of generally vertically oriented sockets 66 extend from the top 68 to the bottom 70 of the block 56, and the sockets 66 swingably mount first and second herbicide applicator arms 72 and 74 therein.

Each of the applicator arms 72 and 74 have an upright segment 76 having a stub end 78 which is swingably received within sockets 66 so that the applicator arms 72 and 74 may be swung through an arc toward and away from each other so as to take on a plurality of alternative positions, such as 80 and 82 (FIG. 2), so as to vary the distance of separation between the terminal ends 84 and 86 of the applicator arms.

The stub ends 78 are provided with first and second flattened surfaces 88 and 90 (FIG. 2) against which set screws 92 may be rigidly set so as to retain the applicator arms in predetermined positions. It has been found helpful to utilize a pair of set screws 92 positioned one above the other to engage each stub shaft 78 as best shown in FIG. 1.

Accordingly, the sockets 66 and set screws 92 cooperate to swingably mount the herbicide applicator arms 72 and 74 for swinging movement about generally vertical axes centered on the sockets 66 so that the terminal ends 84 and 86 of the applicator arms may be swung toward and away from one another so as to provide a means for varying the distance of separation between the terminal ends.

The herbicide applicator arms 72 and 74 preferably extend laterally outwardly from the frame 18, preferably lying at approximately right angles to the rearwardly extending bar 22, as best shown in FIG. 2. In some situations, however, as when the spacing of adjacent row crops in less than normal, it may be desirable to swing the arms 72 and 74 toward one another as shown by alternate positions 80 and 82 (FIG. 2) to assure that the terminal ends 84 and 86 are over the empty spaces between adjacent rows of crop so that excess herbicide drippage from the ends of the arms will fall harmlessly between the rows of crop, as will be described further hereafter.

Each of the applicator arms 72 and 74 is tightly wrapped with a continuous strand of highly absorbtive and conductive wicking material 94. The material 94 may be any known fiberous product which produces a wicking action and is capable of receiving and absorbing herbicide and conducting the herbicide laterally along the wicking material.

The block 56 has a pair of parallel, spaced apart generally upright bores 96 and 98, a discharge or outlet tube 100 (FIG. 6) being passed through each of such bores and terminating directly above the wicking 94 of the arms 72 and 74, as best shown in FIG. 1. The discharge tube 100 may be made of any appropriate material adequate to convey herbicide chemicals therealong, a relatively rigid rubber or plastic tubing being preferred.

Transverse threaded bores 146 extend from the front of block 56 to the bores 96 and 98 and set screws 148 are received in bores 146 and retain the tubes 100 therein. At the bottom of the herbicide reservoir 50 an outlet fitting 102 joins the reservoir in fluidtight relationship therewith and receives the end of the Y-shaped fluid flow delivery system 104 which includes first and second tubes 106 and 108 which extend downwardly and include metering chambers 110. The lower end of metering chamber 110 includes the outlet tube 100 already described and it should be understood that the tube 100 is in tightly sealed relationship with the lower end of the metering chamber 110 to conduct herbicide out of chamber 110. Each of the tubes 106 and 108 are formed of appropriate rubber or plastic-like material which is impervious to herbicide chemicals and sufficiently flexible to withstand the rigors of agricultural usage.

The metering chamber 110 is formed of generally transparent plastic-like material and has an upper nipple 112 which permits an easy joining of the observation chamber with the tubes 106 and 108. Passing downwardly through the nipple 112 and into the observation chamber 110 is a small diameter metal metering pipe 114 which permits herbicide to flow therethrough on a drop-by-drop basis so that an operator observing the chamber 110 can count the drops of herbicide leaving the pipe 114 in a given time interval and thereby define an appropriate predetermined flow rate. It has also been found helpful to have the observation chamber located as shown so as to shelter falling droplets 142 from the effects of side winds which otherwise could deflect the droplets sufficiently to cause them to bypass the arms 72 and 74 and fall on the protected crop.

Positioned along each of the tubes 106 and 108 is a substantially identical metering valve 116, best illustrated in FIGS. 3 and 5. Since the valves 116 are substantially identical, only one of them will be described in detail, namely that associated with tube 106.

Metering valve 116 utilizes a generally U-shaped member 118 which is rigidly fixed to the front surface 46 of the panel 20 by any known means and has a web 120 and a front face 122. The web 120 has a generally circular tube aperture 124 through which the tube 106 and 108 extends on its way to the block 56.

The face 122 has an aperture 126 which is threaded to receive adjusting bolt 128. A nut 130 is provided on the shaft of the bolt 128 so as to retain the bolt 128 in any desired stage of advancement relative to the front face 122. A clamp 132 (FIGS. 3 and 5) has a transverse bore 134 whose diameter is slightly larger than the shaft diameter of the bolt 128 so that the bolt 128 turns freely within the unthreaded bore 134, thereby moving the clamp 132 toward or away from the compressable tube 106 in response to rotation of the bolt 128 and resistance of tube 106. Accordingly, the metering valves 116, delivery system 104, chamber 110 and outlet 100 collectively comprise a herbicide flow control means by which downward flow of herbicide may be closely controlled.

To assure a continuous flow of herbicide through the tubes 106 and 108 and past the metering valves 116, a flow stabilizer 136 is provided within each tube 106 and 108. The stabilizer 136 is formed of a thin bead of flexible rubber or plastic-like material which is preformed to have a generally arcuate shape such as that shown in FIG. 7. When the arcuately shaped stabilizer 136 is inserted within the tube 106 or 108, the natural tendency of the stabilizer to resume its arcuate position biases the stabilizer against the inner surfaces of the tube 106 as best shown in FIG. 4. This biasing of the stabilizer 136 causes it to be retained in any predetermined position along the tube at which it is located. Flow stabilizers 136 are positioned in tubes 106 and 108 so as to confront the metering clamp 132 and to thereby prevent collapse of the tube 106 or 108 as best shown in FIG. 5, where the stabilizer 136 always assures that a narrow but consistently unobstructed portion of tube is left open for downward flow of herbicide to the applicator arms. Accordingly, each of the stabilizers 136 comprise a stop to prevent collapse of the tubes due to excessive tightening of the metering valves 116. Some operators tend to sometimes tighten the metering valves 116 to the point where flow along the tubes 106 or 108 is actually obstructed in toto, and if many types of commercially available tubing are left clamped shut, the internal channel of the tubing, particularly when herbicide may be present in the tubing, may permanently bond and seal, thereafter making the tube substantially unusable or greatly reduced in effiency. The flow stabilizer 136 also eliminates this potential problem.

In operation, the operator first mounts the dispensing apparatus 10 on a cultivator or other movable farm vehicle by attaching the mounting bar 22 to one of the brackets 12 of the cultivator by inserting bolts 26 and securing them in an appropriate manner. The number of dispensing apparatuses 10 used in conjunction with the cultivator will vary depending upon the specific requirements of the crop to be protected, but in normal usage a plurality of such dispensing apparatuses will be employed.

The operator next adjusts the height of the dispensing apparatus 10 so that the elevation of the applicator arms 72 and 74 is above the height of the crop. This vertical adjustment is accomplished by tightening or loosening the chain 32 so as to swing the mounting bracket 12 about axis 16 thereby raising or lowering the dispensing apparatus 10 relative to ground level. After having obtained the desired elevation of the arms 72 and 74, the operator next swings the upright panel 20 about hinge axis 24 so that the panel is in a generally vertical plane, such adjustment being accomplished by first loosening the nuts 44 and 45, swinging the panel 20 into a vertical plane and then retightening such nuts on threaded rod 36.

The applicator arms 72 and 74 are next secured in operating positions preferably with the arms extending outwardly in positions 138 and 140 at generally right angles to the bar 22 as best shown in FIG. 2. The operator next observes whether the terminal ends 84 and 86 are at an acceptable distance from one another so that when the crop is centered midway between the ends 84 and 86, any drippage of herbicide from the terminal ends will fall in the empty spaces between rows of crop. If the distance is acceptable with the arms in the shown positions 138 and 140, the operator tightens the set screws 92 against the stub ends 78 of the arms and into engagement with the flattened surfaces 88, thereby securely retaining the arms in positions 138 and 140. if the distance of separation between the terminal ends is too great, the operator loosens the set screws 78 and swings the arms 72 and 74 toward one another to an intermediate position such as that shown at 80 and 82 in FIG. 2 and then secures the set screws rigidly against the stub ends 78. A second set of flattened surfaces 90 may be provided on the arms to better retain the arms in positions 80 and 82.

The herbicide reservoir 50 is next opened by removing the filler cap 52 and an appropriate herbicide is added to the reservoir. As the reservoir fills, the fluid passes downwardly through fitting 102 and into delivery tube system 104, dividing at the Y junction and flowing downwardly along tubes 106 and 108.

Because it is desirable to use no more herbicide than that needed to accomplish the destruction of unwanted plants and weeds, the operator next carefully adjusts the rate of flow of herbicide leaving the outlet tubes 100. Initially, on filing the reservoir 50, it is desirable to have a fairly steady flow of herbicide so that the wicking 94 on the applicator arms becomes rapidly saturated. Once saturation has occurred, it is desirable to reduce the rate of flow so that ideally the newly discharged herbicide from outlets 100 just equals the loss of herbicide from the arms due to application to weeds and to evaporation.

To adjust the flow rate, the operator now directs his attention to each of the metering valves 116.

Because the metering valves 116 are substantially identical, only the operation of the valve associated with tube 106 will be described in detail. To actuate the metering valve, the operator first loosens lock nut 130, permitting the operator to freely advance or retract the screw 128 through threaded aperture 126. As the screw 128 is advanced, it rotates freely in the unthreaded aperture 134 of clamp 132 and thereby urges clamp 132 forwardly against the outer periphery of the tube 106 (FIGS. 3 and 5). Forward movement of the clamp 134 compresses the tube 106, thereby reducing the flow rate of herbicide therethrough. The presence of flow stabilizer 136 prevents collapse of the tube and assures an even continuous flow even under high compression.

While rotating the screw 128, the operator carefully observes the rate at which droplets 142 (FIG. 6) of herbicide leave the pipe 114 and counts the number of drops leaving the pipe during a given time interval, such as one minute. After some experimentation with his crop conditions, an operator determines a desired flow rate at which the droplets 142 should leave the tube 114 in order to keep the wicking 94 of applicator arm 72 saturated with herbicide yet have a minimum of herbicide drippage from terminal end 84 of the arm.

During operation the flow stabilizer 136 retains its predetermined position along the tube 106 or 108 because of its arcuate shape, biasing itself against the inner periphery 107 of the tube so as to retain itself in position. When the mtering clamp 132 is applied against the tube 106, the clamping pressure provides a further means of retaining the stabilizer in the shown position of FIG. 3.

After achieving a desired flow rate on the first metering valve 116 associated with tube 106, the second clamp 116 associated with tube 108 is set for substantially the same rate.

The operator next actuates the cultivator and its power means to move the cultivator in a forward direction 144, resulting in the dispensing apparatus 10 moving in the same direction, the row crop such as soy beans or cotton underlying the applicator arms 72 and 74 without actual contact with the arms. Any higher growing plants such as a stalk of volunteer corn, a sunflower or other undesired weed will contact the applicator arms 72 or 74 and the herbicide impregnated wicking means 94 will deposit an adequate amount of herbicide on the plant to destroy it. Occasionally stretches of field will be encountered where no weeds are present and an excess amount of herbicide can accumulate in the wicking. When such a situation develops, the excess herbicide tends to flow to the terminal end 84 or 86 of the downwardly angled applicator arms, and excess herbicide falls downwardly in the form of droplets 150 into the empty space between the rows of crop.

Accordingly, the present invention provides a device with which herbicide can be properly applied to unwanted plants without applying it to the protected crop. Because the applicator arms utilize a relatively small surface area of wicking compared with most presently available products and because no spraying activity is involved, only a minimum amount of herbicide is used during operation and the herbicide is dispensed as needed on a drop-by-drop basis rather than providing a large soaked mat or fabric in which high drippage and evaporation are problems. The simplicity of structure makes the invention easily manufactured and results in minimal maintenance requirements while providing a highly efficient and reliable applicator.

While the preferred embodiment of the present invention has been described, it should be understood that various changes, adaptations and modifications may be made therein without departing from the spirit of the invention and the scope of the appended claims.

What is claimed is:

1. A herbicide dispensing apparatus attachable to a movable vehicle for applying herbicide from a herbicide reservoir to unwanted plants which extend above crops planted in spaced-apart rows comprising:

a frame attachable to the vehicle for forward movement with the vehicle in a predetermined direction;

first and second herbicide applicator arms, each having an outer terminal end and means selectively swingably lockingly mounting each arm to said frame and said arms extending outwardly from said frame in leftward and rightward directions, respectively, generally transversely to the direction of forward movement and being slanted downwardly from said frame to overlie and extend laterally to each side of a crop row during operation;

herbicide flow control means carried by said frame and connectable to the reservoir and extending to said first and second arms to deliver herbicide from the reservoir to each of said arms;

wicking means comprising a continuous rope type wick wrapped in closely adjacent helical coils along each of said arms to absorb the herbicide and wick the herbicide laterally along said arms and to apply such herbicide by physical contact to unwanted plants which contact said wicking means;

whereby said wicking means and said arms can be arranged to terminate between adjacent rows of crop so that any excess herbicide not applied to unwanted plants drips off only the terminal ends of said arms and falls harmlessly into the space between adjacent rows of crop so as to avoid impregnating the crops with herbicide.

2. A herbicide dispensing apparatus attachable to a movable vehicle for applying herbicide from a herbicide reservoir to unwanted plants which extend above crops planted in spaced-apart rows comprising:

a frame attachable to the vehicle for forward movement with the vehicle in a predetermined direction;

first and second herbicide applicator arms, each having an outer terminal end and both arms being carried by and extending outwardly from said frame in leftward and rightward directions, respectively, generally transversely to the direction of forward movement so that said arms overlie and extend laterally to each side of a crop row;

herbicide flow control means carried by said frame and connectable to the reservoir and extending to said first and second arms to deliver herbicide from the reservoir to each of said arms;

wicking means carried by said arms to absorb the herbicide and wick the herbicide laterally along said arms and to apply such herbicide by physical contact to unwanted plants which contact said wicking means;

said wicking means on said arms being inclined downwardly and outwardly from said frame and terminating between adjacent rows of crop so that any excess herbicide not applied to unwanted plants drips off said wicking means and falls harmlessly into the space between adjacent rows of crop so as to avoid impregnating the crop with herbicide;

said flow control means further including first and second compressable, hollow, resilient tubes communicating with the reservoir, said first tube having a tube end terminating above and closely confronting said wicking means of said first arm and said second tube having a tube end above and closely confronting said wicking means of said second arm;

first and second metering valves positioned on said first and second tubes, respectively, to control herbicide flow through said tubes by selectively compressing said tubes; and first and second elongated stops positioned within said first and second tubes, respectively, and confronting said metering valves through said tubes to inhibit collapse of said tubes in response to excessive closing of said valves so as to assure even flow of herbicide along said tubes.

3. The herbicide dispensing apparatus of claim 2 wherein each of said first and second tubes includes a transparent observation chamber therealong so that an operator may observe the drippage rate of herbicide passing through said chamber and thereby set said metering clamps to achieve a desired herbicide flow rate.

4. A herbicide dispensing apparatus attachable to a movable vehicle for applying herbicide from a herbicide reservoir to unwanted plants which extend above crops planted in spaced-apart rows comprising:

a frame attachable to the vehicle for forward movement with the vehicle in a predetermined direction;

first and second applicator arms, each having an outer terminal end and both arms being carried by and extending outwardly from said frame in leftward and rightward directions respectively generally transversely to the direction of forward movement so that said arms overlie and extend laterally to each side of the crop row;

herbicide flow control means carried by said frame and interposed in fluid flow relationship between the reservoir and said first and second arms to deliver herbicide from the reservoir to each of said arms;

wicking means carried by said arms to absorb the herbicide and wick the herbicide laterally along said arms and to apply such herbicide by physical contact to unwanted plants which contact said wicking means said flow control means further including first and second compressable, hollow, resilient tubes attachable to the reservoir, said first tube having an end terminating above and closely confronting said wicking means of said first arm and said second tube having an end above and closely confronting said wicking means of said second arm;

said flow control means further including first and second metering clamps positioned on said first and second tubes, respectively, to control herbicide flow through said tubes by selectively compressing said tubes to obstruct flow therethrough;

said flow control means further including first and second stops positioned within said first and second tubes, respectively, and confronting said metering clamps through said tubes to inhibit collapse of said tubes in response to excessive tightening of said metering clamps to assure even flow of herbicide along said tubes.

5. The herbicide dispensing apparatus of claim 4 wherein said stops are formed of thin rubber-like elongated beading material and are arcuate in shape so that when inserted within said tubing, said arcuate shape biases such beading material against said tubing, retaining it in a predetermined position within said tubing.

* * * * *